US008521218B2

(12) United States Patent  
Dhaliwal et al.

(10) Patent No.: US 8,521,218 B2  
(45) Date of Patent: *Aug. 27, 2013

(54) METHOD FOR AN ELECTRONIC DEVICE FOR PROVIDING GROUP INFORMATION ASSOCIATED WITH A GROUP OF CONTACTS

(75) Inventors: Puneet S. Dhaliwal, Hayward, CA (US); Paul W. Hangas, San Jose, CA (US)

(73) Assignee: Motorola Mobility LLC, Libertyville, IL (US)

( * ) Notice: Subject to any disclaimer, the term of this patent is extended or adjusted under 35 U.S.C. 154(b) by 192 days.

This patent is subject to a terminal disclaimer.

(21) Appl. No.: 12/879,838

(22) Filed: Sep. 10, 2010

(65) Prior Publication Data

US 2012/0064925 A1    Mar. 15, 2012

(51) Int. Cl.
*H04M 1/00* (2006.01)
(52) U.S. Cl.
USPC ............ 455/550.1; 455/556.2; 455/566
(58) Field of Classification Search
USPC ............ 455/412.2–414.1, 466, 556.1–556.2, 455/566; 715/738–739, 759
See application file for complete search history.

(56) References Cited

U.S. PATENT DOCUMENTS

| | | | |
|---|---|---|---|
| 2005/0261011 A1* | 11/2005 | Scott | 455/466 |
| 2007/0038934 A1 | 2/2007 | Fellman | |
| 2007/0129112 A1* | 6/2007 | Tarn | 455/566 |
| 2007/0232292 A1* | 10/2007 | Larocca | 455/425 |
| 2009/0023472 A1* | 1/2009 | Yoo et al. | 455/556.1 |
| 2009/0143114 A1 | 6/2009 | Vargas et al. | |
| 2009/0177981 A1* | 7/2009 | Christie et al. | 715/758 |
| 2009/0197617 A1* | 8/2009 | Jayanthi | 455/456.2 |
| 2009/0215486 A1* | 8/2009 | Batni et al. | 455/550.1 |
| 2009/0325615 A1 | 12/2009 | McKay et al. | |
| 2010/0058193 A1* | 3/2010 | Sherrard et al. | 715/738 |
| 2010/0179991 A1 | 7/2010 | Lorch et al. | |
| 2011/0010340 A1* | 1/2011 | Hung et al. | 707/623 |
| 2011/0065462 A1* | 3/2011 | Larocca | 455/466 |
| 2012/0064863 A1* | 3/2012 | Dhaliwal et al. | 455/414.1 |
| 2012/0166568 A1* | 6/2012 | Helbling et al. | 709/206 |

FOREIGN PATENT DOCUMENTS

WO    2008131452 A1    10/2008

OTHER PUBLICATIONS

Patent Cooperation Treaty, "PCT Search Report and Written Opinion of the International Searching Authority" for International Application No. PCT/US2011/47160, Feb. 24, 2012, 7 pages.

* cited by examiner

*Primary Examiner* — Simon Nguyen

(57) ABSTRACT

There is disclosed a method of an electronic device for providing group information associated with a group of contacts. After a group name associated with a group of contacts is obtained, the electronic device allows selection of one or more contacts of the group of contacts. Distinction between contacts of the group of contacts that are recipients and contacts of the group of contacts that are not recipients is provided based on the selection of the contact(s). The electronic device displays contacts that are recipients in place of the group name at a display.

15 Claims, 14 Drawing Sheets

METHOD FOR AN ELECTRONIC DEVICE FOR PROVIDING GROUP INFORMATION ASSOCIATED WITH A GROUP OF CONTACTS

RELATED APPLICATIONS

This application is related to U.S. application Ser. No. 12/879,835, filed Sep. 10, 2010, titled METHOD FOR AN ELECTRONIC DEVICE FOR PROVIDING CONTACT OR GROUP INFORMATION FOR A CONTACT OR GROUP OF CONTACTS; U.S. application Ser. No. 12/556,776, filed Sep. 10, 2009, titled PORTABLE ELECTRONIC DEVICE FOR PROVIDING A VISUAL REPRESENTATION OF A WIDGET; and U.S. application Ser. No. 12/556,783, filed Sep. 10, 2009, titled WIRELESS COMMUNICATION DEVICE FOR PROVIDING A VISUAL REPRESENTATION OF A WIDGET.

FIELD OF THE INVENTION

The present invention relates generally to the field of portable electronic devices and, more particularly, to the field of a portable electronic device having a display for providing messaging capabilities.

BACKGROUND OF THE INVENTION

A portable electronic device is capable of interacting with a user and transportable due to its diminutive size and portable power supply. An example of a portable electronic device is a wireless communication device, which provides long-range communication of voice or data over a communication network of specialized base stations to other communication devices remote from the wireless communication device. Portable electronic devices come in a variety of form factors, such as brick, bar, flip/clamshell, slider or rotator/swivel form factors, and each form factor can have a touch-screen or QWERTY keypad. Regardless of the small form factor, the device generally includes a display to convey information to a user or otherwise facilitate the user's use and enjoyment of the device.

Displays of portable electronic devices may provide a variety of visual objects, and visual objects include widgets and applications. A widget is an interactive virtual tool that provides a single-purpose service, such as providing the user the news, weather, time, calendar, or other single-purpose information. On a portable electronic device, widgets provide a user of the device high level snippets of information at a glance. A widget may include an image or icon to aid the user's comprehension of the information. An application is any program designed to perform a specific function directly for the user or, in some cases, for another application program. Applications perform functions directly to a user and distinguish from system software, such as operating systems, and middleware which is sometimes associated with programs that mediate between applications and system software or between two applications. Examples of application programs include email clients, messaging clients, word processors, database programs, Web browsers; development tools; drawing, paint, and image editing programs; and communication programs. The challenge is providing an informative widget or application within a minimal area of the display, due to the diminutive size of the device.

DETAILED DESCRIPTION OF THE EMBODIMENTS

An aspect of the present invention a method of an electronic device for providing group information associated with a group of contacts at a display. A group name associated with a group of contacts is obtained. Selection of at least one contact of the group of contacts is allowed at a user interface. Distinction between contacts of the group of contacts that are recipients and contacts of the group of contacts that are not recipients is provided based on the selection of the at least one contact at the display. Contacts of the group of contacts that are recipients are displayed in place of the group name at a display.

Figure 1:
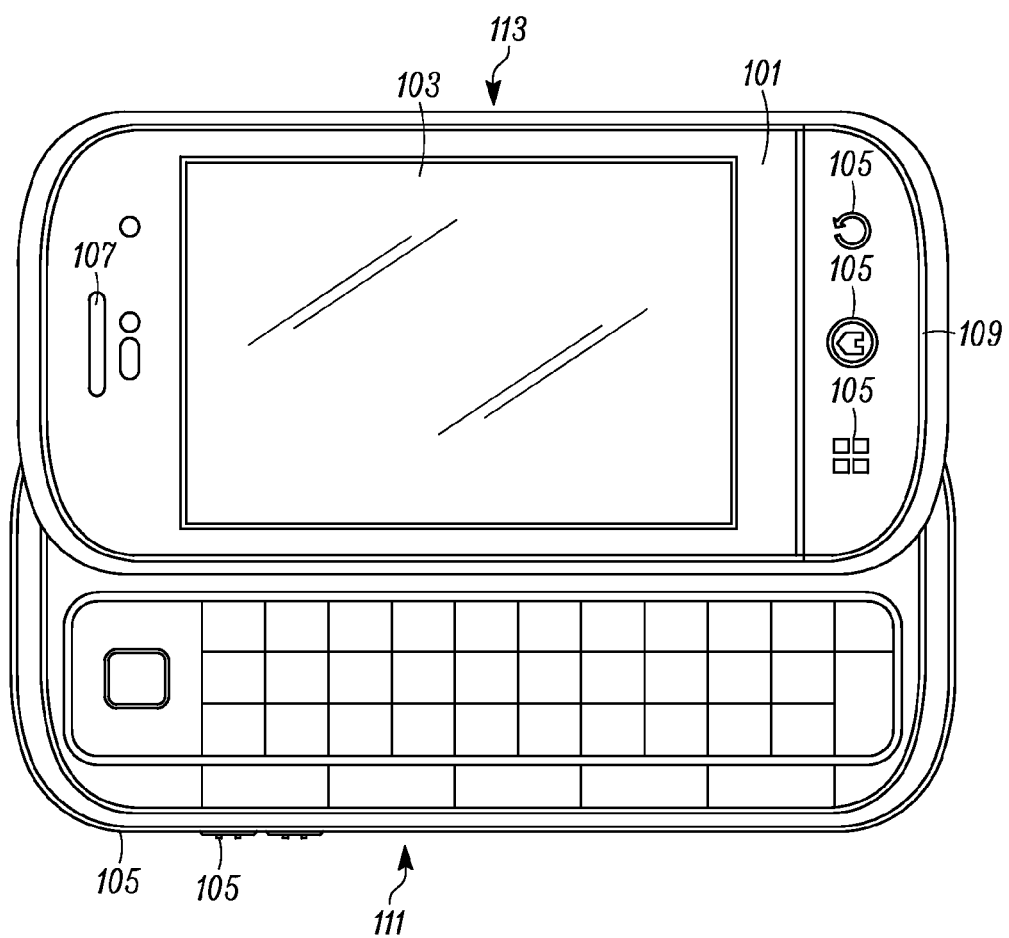
FIG. 1 is a top planar view of an embodiment in accordance with the present invention, in which the embodiment is shown in its open configuration.

Referring to FIG. 1, there is illustrated a perspective view of an example portable electronic device 100 in accordance with the present invention. The device 100 may be any type of device capable of providing messaging capabilities. Examples of the portable electronic device 100 include, but are not limited to, cellular-based mobile phones, WLAN-based mobile phones, personal digital assistants, personal navigation device, touch screen input device, pen-based input devices, portable video and/or audio players, and the like.

For one embodiment, the portable electronic device 100 has a housing comprising a front surface 101 which includes a visible display 103 and a user interface. For example, the user interface may be the touch-sensitive surface that overlays the display 103. For another embodiment, the user interface of the portable electronic device 100 may include a touch-sensitive surface supported by the housing and does not overlay any type of display. For yet another embodiment, the user interface of the portable electronic device 100 may include one or more input keys 105. Examples of the input key or keys 105 include, but are not limited to, keys of an alpha or numeric keypad or keyboard, a physical keys, touch-sensitive surfaces, mechanical surfaces, multipoint directional keys and side buttons 105, 111. The portable electronic device 100 may also comprise apertures 107, 109 for audio output and input at the surface. It is to be understood that the portable electronic device 100 may include a variety of different combination of displays and interfaces.

It is to be understood that the portable electronic device 100 make take the form of a variety of form factors, such as bar, tablet, flip/clam, slider and rotator form factors. For example, for the embodiment shown in FIG. 1, the portable electronic device 100 may include a first housing 111 having an upper surface, a second housing 113 having a lower surface slidably coupled to the upper surface of the first housing. As represented in FIG. 1, the device 100 is shown in a closed position. The second housing 113 is capable of sliding to a closed position relative to the first housing in which upper and lower surfaces are substantially adjacent and concealed. The device 100 may also open to an open position. The second housing 113 is capable of sliding to an open position relative to the first housing 111 in which only a portion of the upper and lower surfaces are adjacent and concealed and the remainders of the upper and lower surfaces are offset and exposed. For another embodiment, the second housing may support a display, a first user interface, an audio input, and an audio output, and the first housing may support a second user interface and a wireless transceiver.

Figure 2:
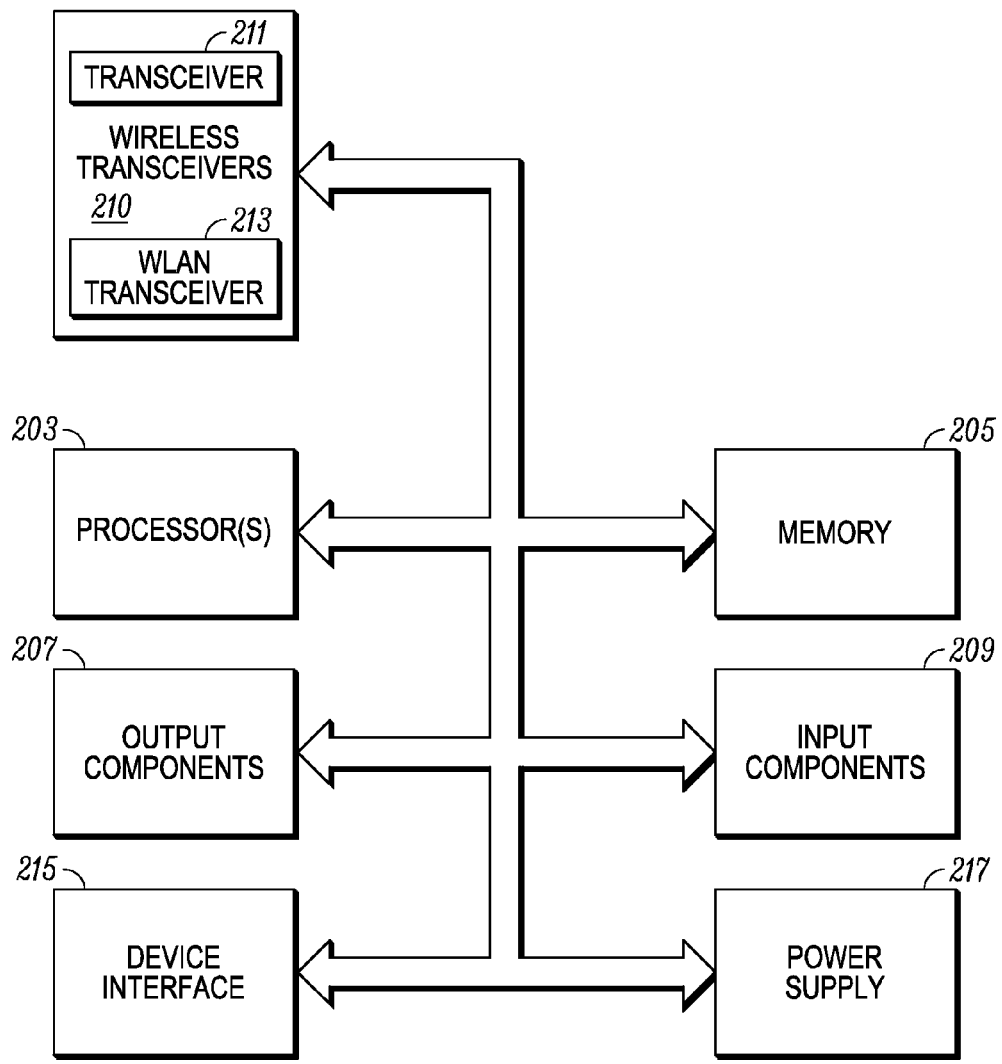
FIG. 2 is a block diagram of example components of the embodiment of FIG. 1.

Referring to FIG. 2, there is shown a block diagram representing example components that may be used for an embodiment in accordance with the present invention. The example embodiment may includes one or more wireless transceivers 201, one or more processors 203, one or more memories 205, one or more output components 207, and one or more input components 209. Each embodiment may include a user interface that comprises one or more output components 207 and one or more input components 209. Each wireless transceiver 201 may utilize wireless technology for communication, such as, but are not limited to, cellular-based communications such as analog communications (using AMPS), digital communications (using CDMA, TDMA, GSM, iDEN, GPRS, or EDGE), and next generation communications (using UMTS, WCDMA, LTE, LTE-A or IEEE 802.16) and their variants, as represented by cellular transceiver 311. Each wireless transceiver 201 may also utilize wireless technology for communication, such as, but are not limited to, peer-to-peer or ad hoc communications such as HomeRF, Bluetooth and IEEE 802.11 (a, b, g or n); and other forms of wireless communication such as infrared technology, as represented by WLAN transceiver 213. Also, each transceiver 201 may be a receiver, a transmitter or both.

The processor 203 may generate commands based on information received from one or more input components 209. The processor 203 may process the received information alone or in combination with other data, such as the information stored in the memory 205. Thus, the memory 205 of the internal components 200 may be used by the processor 203 to store and retrieve data. The data that may be stored by the memory 205 include, but is not limited to, operating systems, applications, and data. Each operating system includes executable code that controls basic functions of the portable electronic device, such as interaction among the components of the internal components 200, communication with external devices via each transceiver 201 and/or the device interface (see below), and storage and retrieval of applications and data to and from the memory 205. Each application includes executable code utilizes an operating system to provide more specific functionality for the portable electronic device. Also, the processor is capable of executing an application associated with a particular widget shown at an output component 207. Data is non-executable code or information that may be referenced and/or manipulated by an operating system or application for performing functions of the portable electronic device.

The input components 209, such as a user interface, may produce an input signal in response to detecting a predetermined gesture at an input component, such as the touch-sensitive surface substantially parallel to the display. As a result, a transceiver 201 may terminate communication with the remote device in response to the input signal from the user interface. In addition, the input components 209 may include one or more additional components, such as a video input component such as an optical sensor (for example, a camera), an audio input component such as a microphone, and a mechanical input component or activator such as button or key selection sensors, touch pad sensor, another touch-sensitive sensor, capacitive sensor, motion sensor, and switch. Likewise, the output components 207 of the internal components 200 may include one or more video, audio and/or mechanical outputs. For example, the output components 207 may include a video output component such as a cathode ray tube, liquid crystal display, plasma display, incandescent light, fluorescent light, front or rear projection display, and light emitting diode indicator. Of particular interest are displays that are capable of providing a visual representation of a widget. Other examples of output components 207 include an audio output component such as a speaker, alarm and/or buzzer, and/or a mechanical output component such as vibrating or motion-based mechanisms.

The internal components 200 may further include a device interface 215 to provide a direct connection to auxiliary components or accessories for additional or enhanced functionality. In addition, the internal components 200 preferably include a power source 217, such as a portable battery, for providing power to the other internal components and allow portability of the portable electronic device 100.

It is to be understood that FIG. 2 is provided for illustrative purposes only and for illustrating components of a portable electronic device in accordance with the present invention, and is not intended to be a complete schematic diagram of the various components required for a portable electronic device. Therefore, a portable electronic device may include various other components not shown in FIG. 2, or may include a combination of two or more components or a division of a particular component into two or more separate components, and still be within the scope of the present invention.

Figure 3:
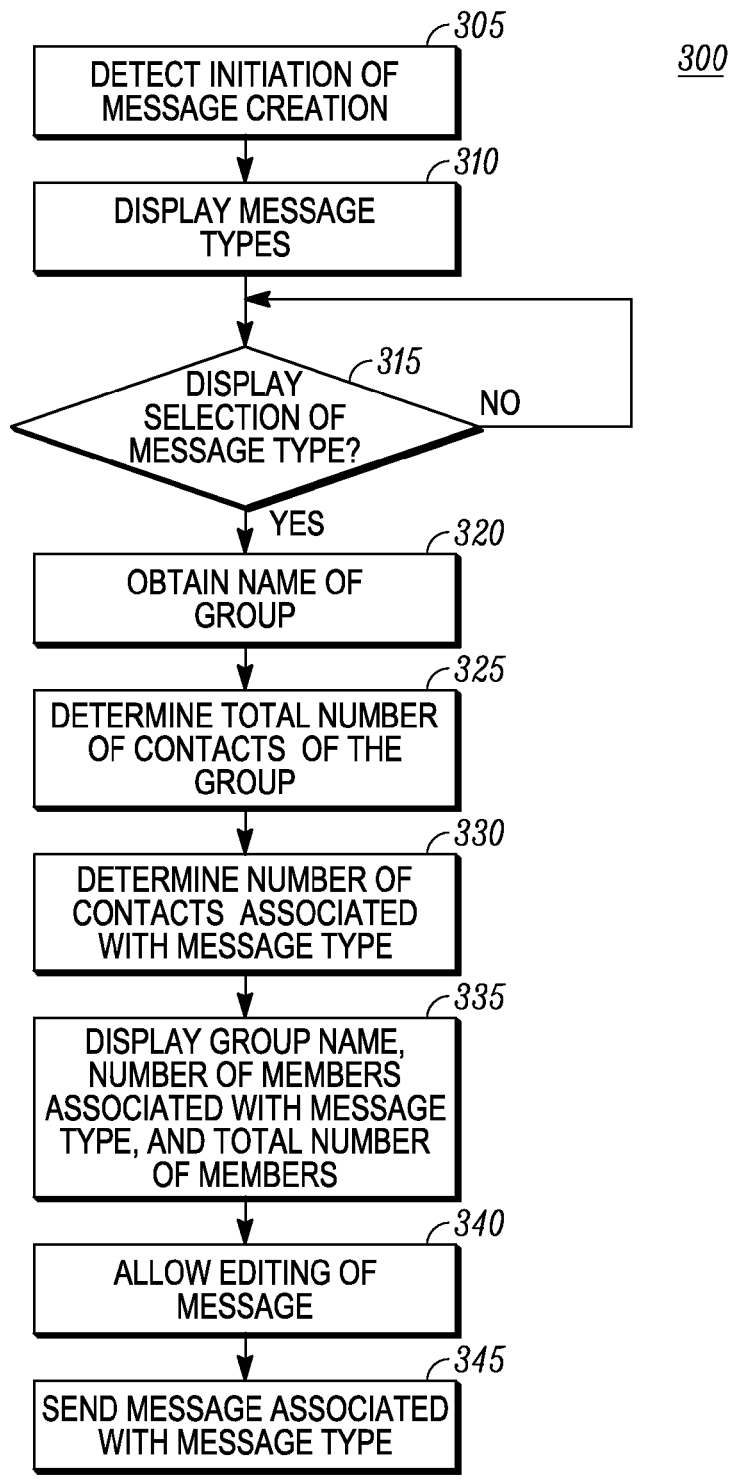
FIG. 3 is a flow diagram representing an example operation of an embodiment in accordance with the present invention.

Referring to FIG. 3, there is shown a flow diagram 300 representing an example operation of an embodiment in accordance with the present invention. The electronic device 100 provides the capability of text, graphic, video and/or multimedia messages, such as electronic mail (email), text messaging, short messaging (SMS), multimedia messaging (MMS), social messaging, calendar messaging, and the like. The user interface 105, including any of the input components 209, of the electronic device 100 may detect initiation of a message creation at step 305. Initiation of the message creation may be accomplished by activating a messaging application, activating a link to a messaging application or bringing a messaging portion of an existing application to the forefront of the display 103. The display 103 of the electronic device 100 may then display two or more message types at step 310. Messages types include, but are not limited to, electronic mail (email), text messaging, short messaging (SMS), multimedia messaging (MMS), social messaging, and calendar messaging. In response to displaying the message types, the user interface 105 detects selection of a particular message type among the two or more message types displayed at the display 103 at step 315.

In response to selecting a message type of the created message, the electronic device 100 obtains a group name, i.e., the name of a particular group of contacts, at step 320. For one embodiment, the group name may be received from the user interface 105 of the electronic device 100. For another embodiment, the electronic device the group name may be retrieved from the memory 205 of the electronic device 100.

The processor 203 of the electronic device 100 may determine a number of contacts associated with the particular message type, at step 325, in response to obtaining the group name. Contacts may be stored in the memory 205, each contact may be associated with one or more message types. For example, for one embodiment, some contacts may include only an email address or email addresses, other contacts may include only a messaging address or messaging addresses, and still other contacts may include both email and messaging addresses. For this embodiment, a selection of an email message type would result in a number of contacts associated with message type based on the number of contacts having one or more email addresses. Likewise, for this embodiment, a selection of a messaging message type would result in a number of contacts associated with the message type based on the number of contacts having one or more messaging addresses.

The processor 203 of the electronic device 100 may determine a total number of contacts of the group of contacts, at step 330, in response to detecting selection of the message type or obtaining the group name. The processor 203 may determine the total number of contacts of the group of contacts regardless of the addresses associated with each contact. It should be noted that the total number of contacts of the group may be determined before, after or concurrently with determining the number of contacts associated with the message type.

The display of the electronic device may display the group name, the number of contacts associated with the particular message type and the total number of contacts, at step 335, in response to determining the number of contacts associated with the particular message type and the total number of contacts of the group of contacts. For one embodiment, the group name, the number of contacts associated with the particular message type and the total number of contacts may be displayed at a header of a message generated by the electronic device. For another embodiment, the number of contacts associated with the particular message type and the total number of contacts may be displayed adjacent to each other.

After displaying the group name, the number of contacts associated with the particular message type and the total number of contacts, the electronic device 100 may allow editing of the message associated with the group name, the number of contacts associated with the particular message type and the total number of contacts based on input from the user interface 105, at step 340. Thereafter, a wireless transceiver 201 of the electronic device 100 may send a message associated with the group name, the number of contacts associated with the particular message type and the total number of contacts at step 345.

Figure 4:
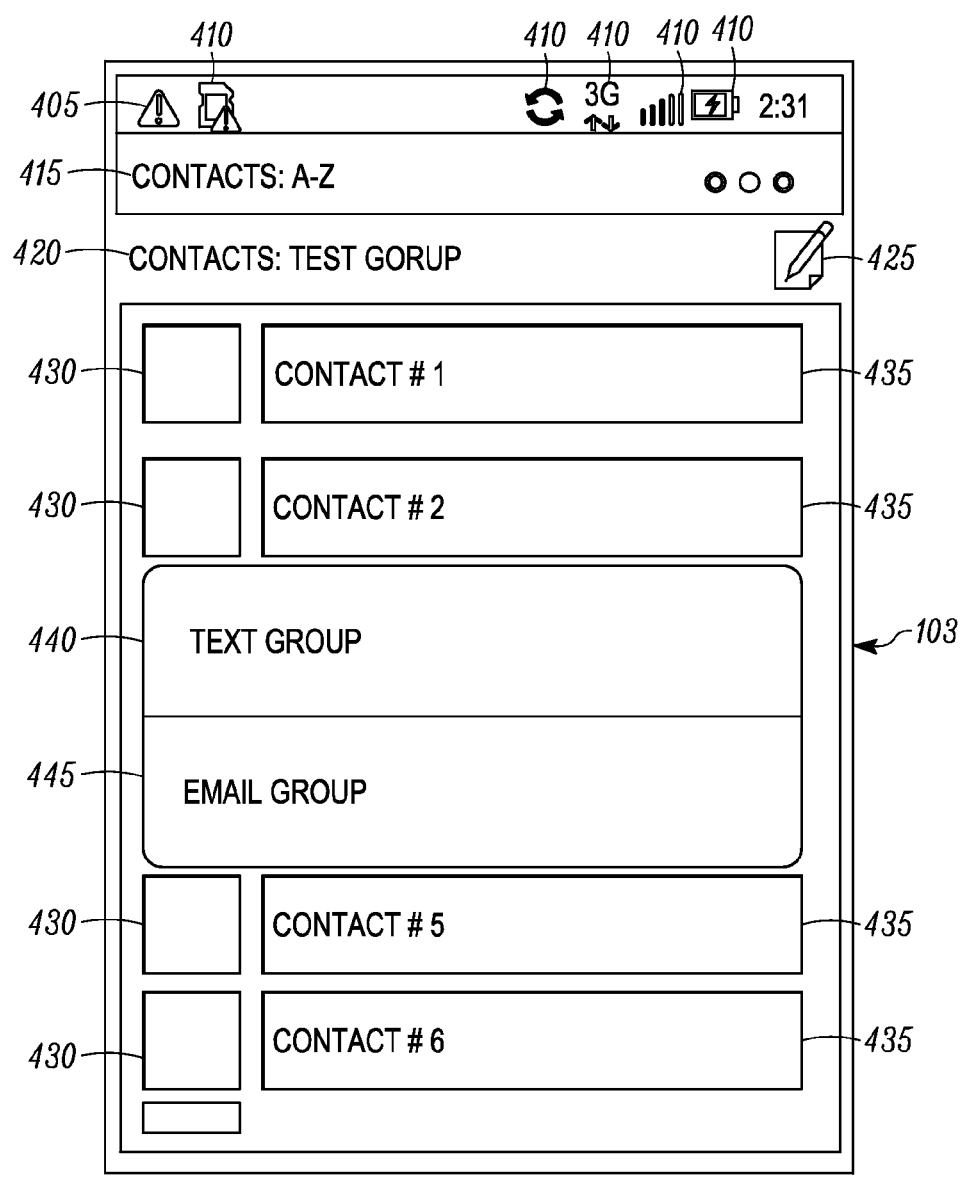
FIG. 4 is a screen view illustrating a step in the flow diagram of FIG. 3.

Referring to FIG. 4, there is shown a screen view illustrating a step in the flow diagram of FIG. 3. The screen view 400 shown in FIG. 4 may include a toolbar 405 for indicating device status and/or general information like the one or more graphical icons 410. The graphical icons 410 may be a phone notification icon, a service level icon, a wireless signal strength status icon, a power level status icon, or any other notification or status icon. The screen view 400 may also include other types of indicators, such as a source identifier 415 associated with the name of the database for storing the contacts in memory 205, a group identifier 420 associated with the name of the group associated with select contacts, and activation buttons 425 for activating one or more functions of the electronic device 100. An example of an activation button is an edit button which, when activated by a user, activates an editing function.

The screen view 400 shown in FIG. 4 represents the action of displaying message types of step 310. The display 103 of the electronic device 100 may show multiple contacts of a particular group, identified by the group identifier 420, in the form of contact visuals 430 and/or contact names 435. For example, each contact may provide a person's name 435 and/or a person's image 430 or, in the alternative, a default image for the contact visual and/or default text for the contact name. The display 103 of the electronic device 100 may also display two or more message types 440, 445 at step 310. As illustrated in FIG. 4, the two or more message types 440, 445 may overlay a portion of the multiple contacts of the particular group. For one embodiment, the two or more message types may include a text group 440 associated with messaging, such as short messaging systems or multimedia systems, and an email group 445 associated with email systems. Selection of one of these message types 440, 445 determines the type of message to be generated by the electronic device 100.

Figure 5:
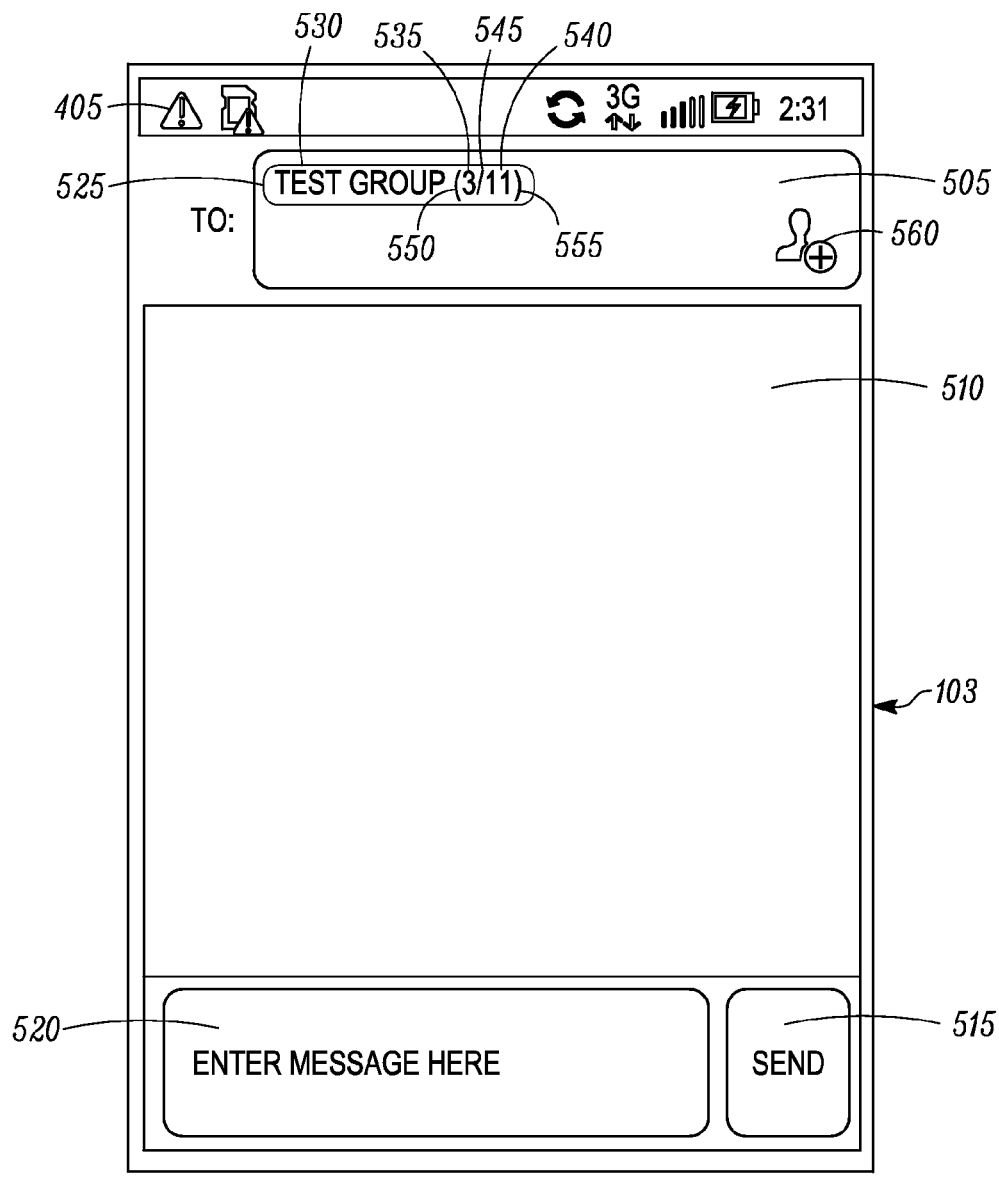
FIG. 5 is a screen view illustrating another step in the flow diagram of FIG. 3.

Referring to FIG. 5, there is shown a screen view 500 illustrating another step in the flow diagram of FIG. 3. The screen view 500 shown in FIG. 5 represents a messaging application that displays the group name, the number of contacts associated with the particular message type and the total number of contacts, as provided by step 335. For the example shown in FIG. 5, there is provided a group name of "Test Group", a number of contacts associated with the particular message type of "3", and a total number of contacts of "11". This information indicates that there are 11 contacts in the group, and 3 of those 11 contacts are associated with messaging addresses. The messaging application includes a messaging header 505, messaging output window 510, messaging input window 515 and a Send button 520 for transmission of text in the messaging input window.

Figure 6:
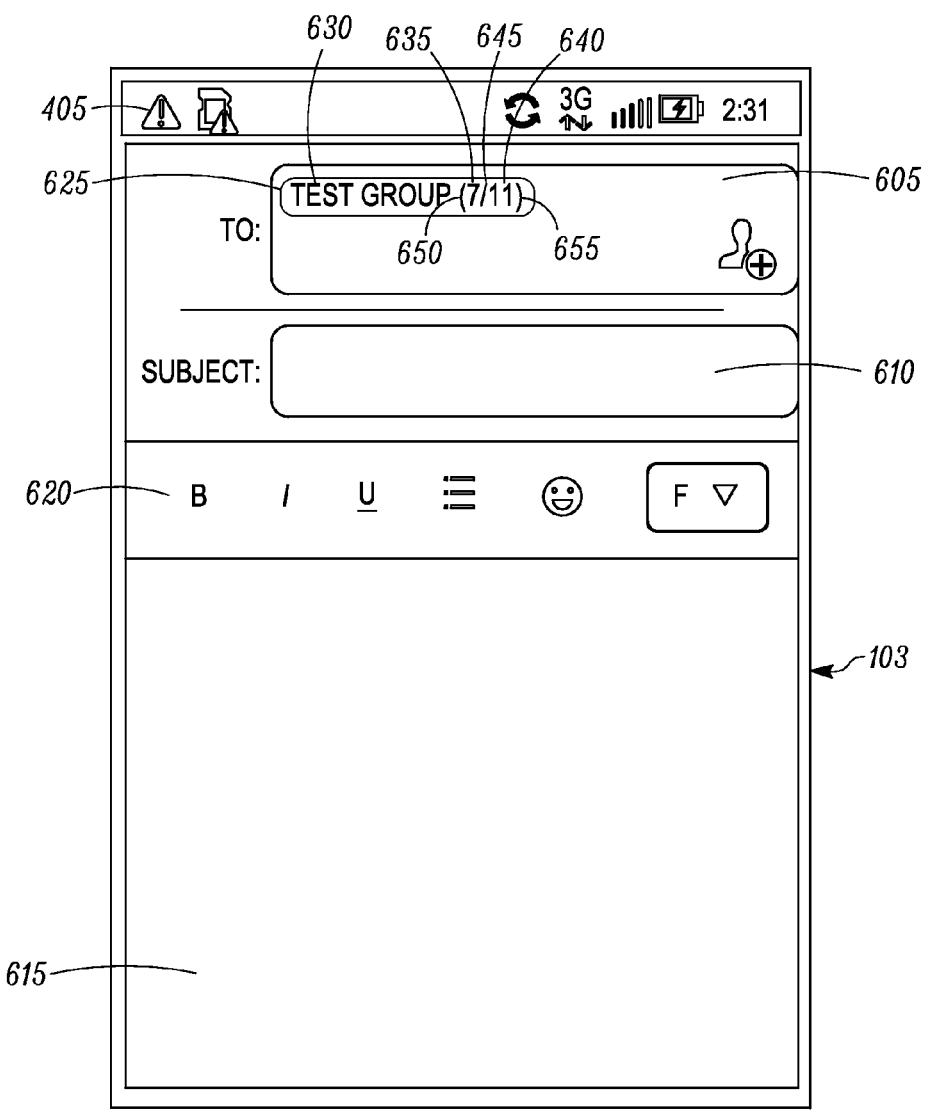
FIG. 6 a screen view illustrating yet another step in the flow diagram of FIG. 3.

Referring to FIG. 6, there is shown a screen view 600 illustrating yet another step in the flow diagram of FIG. 3. The screen view 600 shown in FIG. 6 represents an email application that displays the group name, the number of contacts associated with the particular message type and the total number of contacts, as provided by step 335. For the example shown in FIG. 6, there is provided a group name of "Test Group", a number of contacts associated with the particular message type of "7", and a total number of contacts of "11". This information indicates that there are 11 contacts in the group, and 7 of those 11 contacts are associated with email addresses. The email application includes an email header 605, an email subject line 610, and an email message body 615. For this particular embodiment, the email application may also include a toolbar 620 for enhancement of text in the email message body 615.

For both the messaging embodiment shown in FIG. 5 and the email embodiment shown in FIG. 6, the header 505, 605 includes a group object 525, 625 identified by the group name 530, 630, the number of contacts 535, 635 associated with the particular message type and the total number of contacts 540, 640, which are situated adjacent to each other. The header 505, 605 may also include a divider 545, 645 located between the number of contacts 535, 635 associated with the particular message type and the total number of contacts 540, 640 to distinguish them from each other. The header 505, 605 may further include encompassing symbols 550, 555, 650, 655 about the number of contacts 535, 635 associated with the particular message type and the total number of contacts 540, 640 to distinguish them from the group name 530, 630 or any other part of the header. The header 505, 605 may still further includes an editing icon 560, 660 that, when selected by the user, facilitates changes to the content of the message header.

It should be noted that most existing email, text messaging, SMS, MMS, social messaging, and calendar messaging clients do not allow objectification of selected addresses. Objectification refers to the ability of an object to change state among a text (such as an email or messaging address), a contact and/or a group of contacts. Even where objectification is allowed by a client, existing clients do not allow change or transformation of state of objects. In contrast, the present invention allows transformation of objects in at least six ways: text-to-text, text-to-contact, contact-to-contact, text-to-group, and group-to-contact.

For at least some of the embodiments of the present invention, transformation of state of objectified address entities is allowed. For one embodiment, a user may start a regular address entity/button that represents a text address (like email or phone number). The user may then press-and-hold at the text address entity/button and transform it to a contact address button/entity. For another embodiment, a user may transform the state of an object from a contact address button/entity state to choose multiple addresses for that contact. The address button/entity may still represent the same contact from the contacts database, but its state representation may change/transform. For yet another embodiment, the user may change the state of an object from a text address entity/button to represent a group from the contacts database, thus becoming a Group address button/entity. For still another embodiment, the user may change the state of an object from a Group address entity/button to represent multiple contacts in the contacts database. The user may edit the object and changing it into multiple Contact address buttons/entities.

Figure 7:
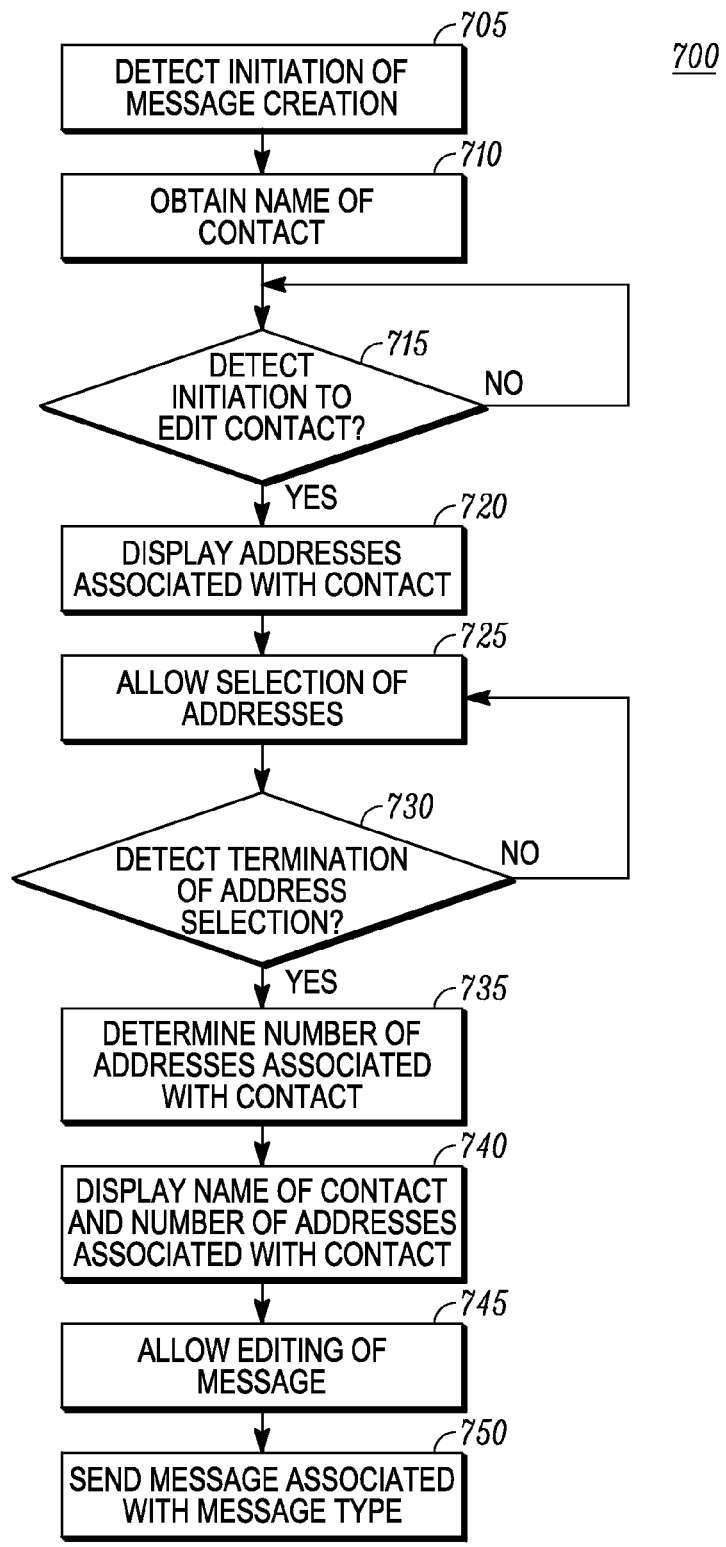
FIG. 7 is a flow diagram representing another example operation of an embodiment in accordance with the present invention.

Referring to FIG. 7, there is shown a flow diagram 700 representing another example operation of an embodiment in accordance with the present invention. The user interface 105 of the electronic device 100 may detect initiation of a message creation at step 705. Initiation of the message creation may be accomplished by activating a messaging application, activating a link to a messaging application or bringing a messaging portion of an existing application to the forefront of the display 103. In response to initiating message creation, the electronic device 100 obtains a group name at step 710. For one embodiment, the group name may be received from the user interface 105 of the electronic device 100. For another embodiment, the electronic device the group name may be retrieved from the memory 205 of the electronic device 100.

After the message creation and establishment of a contact name, the user interface 105 of the electronic device 100 detects initiation of edit contact (i.e., a feature for editing contact information in the current application) at step 715. The display 103 displays the addresses associated with the contact of the contact name at step 720 in response to detecting initiating of the edit contact. The electronic device 100 then allows selection of one or more addresses of the displayed addresses by the user, via the user interface 105 (including any of the input components 209) at step 725. After the user has completed selection of the addresses, the user interface 105 of the electronic device 100 may detect some type of indication that address selection has been terminated at step 730.

The processor 203 of the electronic device 100 may determine a number of target addresses associated with the particular contact, at step 735, in response to detecting termination of address selection. Contacts and their corresponding addresses may be stored in the memory 205. Addresses may include email addresses, short messaging system addresses, multimedia messaging system addresses, and the like. For one embodiment, the number of target addresses of the plurality of addresses is determined based on the selection of the at least one address of the plurality of addresses. For another embodiment, the number of target addresses of the plurality of addresses is determined based on a default number of target addresses and the selection of the at least one address of the plurality of addresses.

The display 103 of the electronic device 100 may display the contact name (i.e., name of the contact) and the number of addresses associated with the particular contact, at step 740, in response to determining the number of addresses associated with the particular contact. For one embodiment, the contact name and the number of addresses associated with the particular contact may be displayed at a header of a message generated by the electronic device. For another embodiment, the contact name and the number of addresses associated with the particular contact may be displayed adjacent to each other.

After displaying the contact name and the number of addresses associated with the particular contact, the electronic device 100 may allow editing of the message associated with the contact name and the number of addresses associated with the particular contact based on input from the user interface 105, at step 745. Thereafter, a wireless transceiver 201 of the electronic device 100 may send a message associated with the contact name and the number of addresses associated with the particular contact at step 750.

Figure 8:
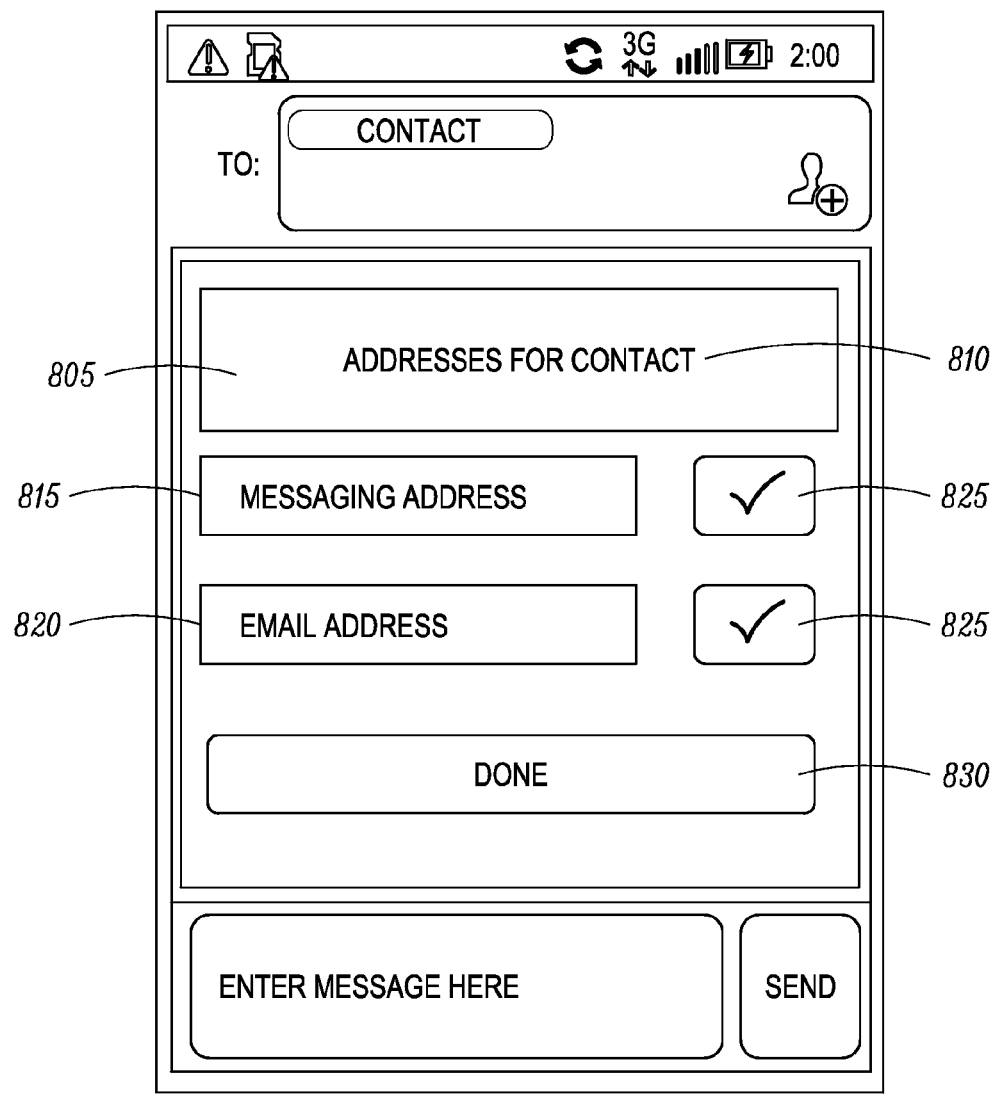
FIG. 8 is a screen view illustrating a step in the flow diagram of FIG. 7.

Referring to FIG. 8, there is shown a screen view 800 illustrating a step in the flow diagram of FIG. 7. The screen view 800 of FIG. 8 represents the steps of displaying addresses, allowing selection of target addresses and detecting termination of target address selection, as provided by steps 720, 725, 730. Screen view 800 provides a window identifier 805 for describing the content as well as the particular contact name 810 of the contact associated with listed addresses 815, 820. The listed addresses 815, 820 may be multiple messaging addresses, multiple email addresses or a combination of messaging and email addresses. The screen view 800 may also include an address indicator 825 corresponding to each address to indicate whether the associated address has been selected or not. When an address is selected, it becomes a target address of the contact to which the message will be sent. The screen view 800 may further include a completion indicator 830 for activation by the user when the address selection is to be terminated.

Figure 9:
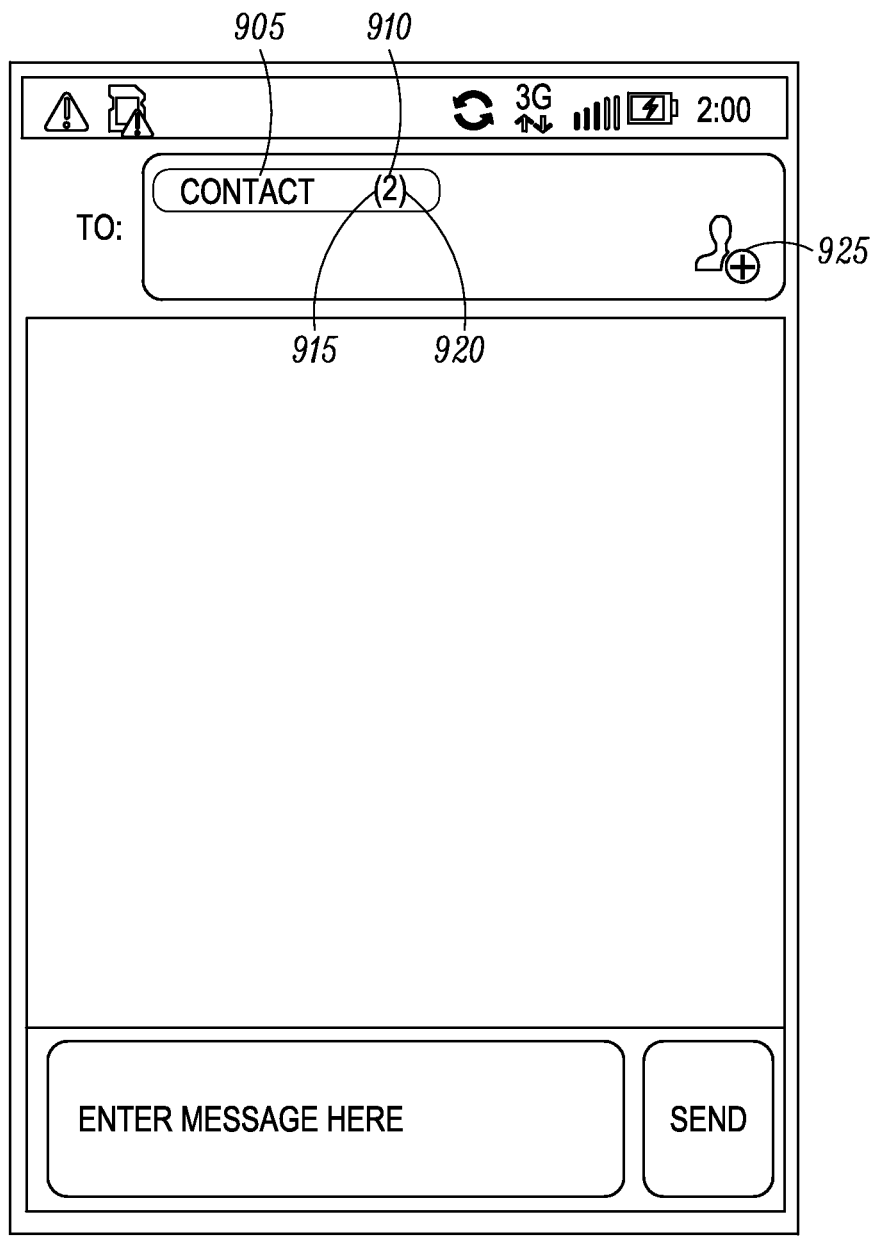
FIG. 9 is a screen view illustrating another step in the flow diagram of FIG. 7.

Referring to FIG. 9, there is shown a screen view illustrating another step in the flow diagram of FIG. 7. The screen view 900 of FIG. 9 represents the step of display the contact name 905 and the number of addresses 910 associated with the contact, as provided by step 740. For the example shown in FIG. 9, there is provided a group name of "Contact" and a number of addresses associated with the particular contact of "2". Similar to FIGS. 5 and 6 above, the header may include encompassing symbols 915, 920 about the number of contacts 910 associated with the particular contact to distinguish them from the contact name 905 or any other part of the header. The header may still further includes an editing icon 925 that, when selected by the user, facilitates changes to the content of the message header.

Figure 10:
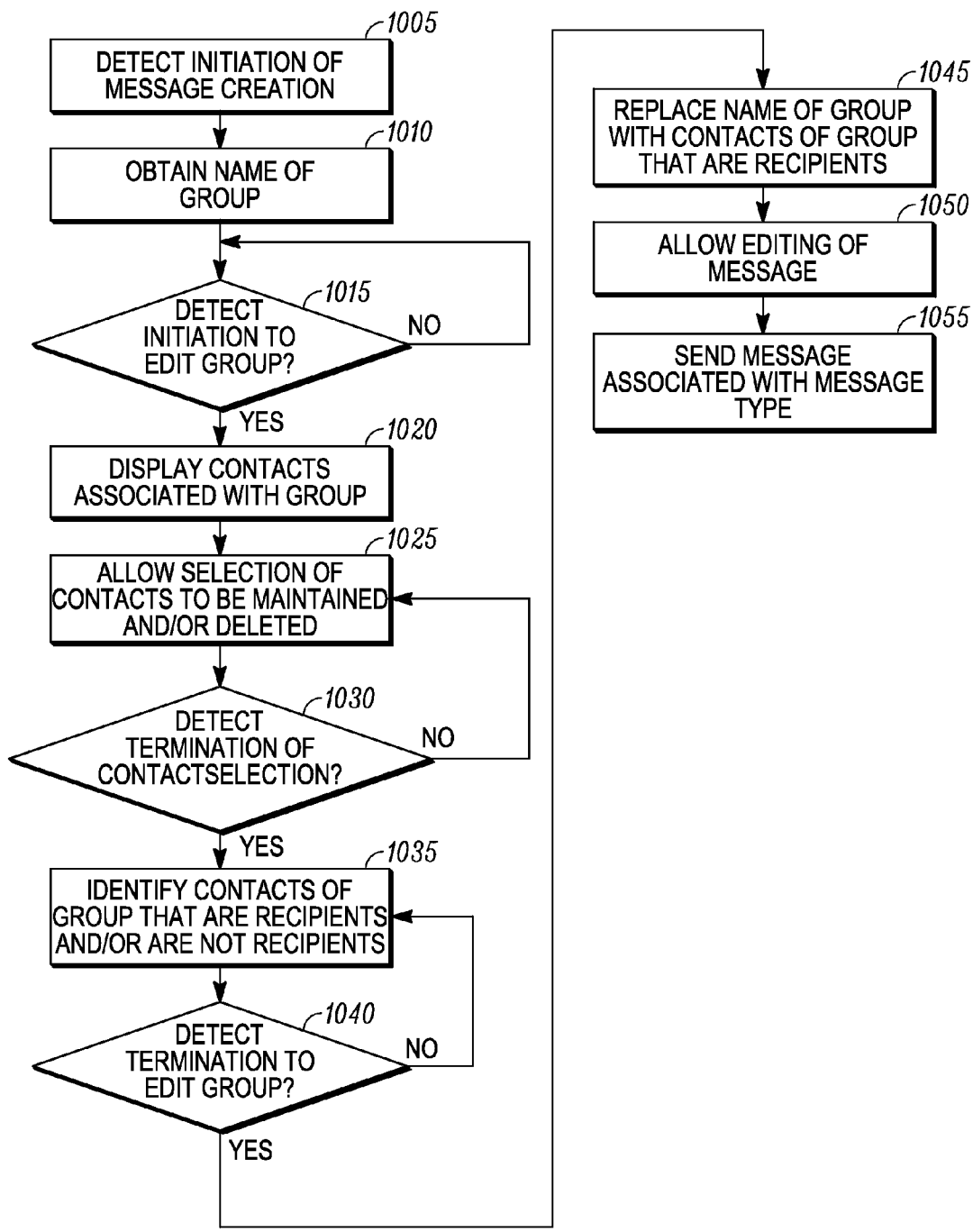
FIG. 10 is a flow diagram representing yet another example operation of an embodiment in accordance with the present invention.

Referring to FIG. 10, there is shown a flow diagram 1000 representing yet another example operation of an embodiment in accordance with the present invention. The user interface 105 of the electronic device 100 detects initiation of message creation at step 1005. In response to initiating message creation, the electronic device 100 obtains a group name at step 1010. For one embodiment, the group name may be received from the user interface 105 of the electronic device 100. For another embodiment, the electronic device the group name may be retrieved from the memory 205 of the electronic device 100.

After the message creation and establishment of a contact name, the user interface 105 of the electronic device 100 detects initiation of edit group at step 1015. The display 103 displays the contacts associated with the group at step 1020 in response to detecting initiating of the edit group. The electronic device 100 then allows selection of one or more contacts of the displayed contacts by the user, via the user interface 105 (including any of the input components 209) at step 1025. The user interface 105 may indicate selection of contacts to be maintained, contacts to be deleted, or both. After the user has completed selection of the contacts, the user interface 105 of the electronic device 100 may detect some type of indication that contact selection has been terminated at step 1030.

The electronic device 100 may identify the contacts of the group that are potential recipients of the created message, are not potential recipients of the created message, or both at step 1035, in response to termination of contact selection. By displaying this information at the display 103 of the electronic device 100, the user receives acknowledgment and confirmation of the contacts selected at step 1025. Thereafter, the user interface 105 of the electronic device 100 detects some type of indication that editing of the group has been terminated at step 1040.

The display of the electronic device may display the contacts of the group that are potential recipients instead of the group name, at step 1045, in response to completion of the contact selection at steps 1025, 1030, or completion of group editing at steps 1035, 1040. For example, the group name may be originally displayed at a header of a message generated by the electronic device, at step 1010 or 1020, and replaced at step 1045 by the individual contacts (such as, contact names) of each contact of the group that was not eliminated by the contact selection of step 1025.

After replacing the group name with contacts of the group that are potential recipients of the message, the electronic device 100 may allow editing of the message based on input from the user interface 105, at step 1050. Thereafter, a wireless transceiver 201 of the electronic device 100 may send the message to the potential recipients at step 1055.

Figure 11:
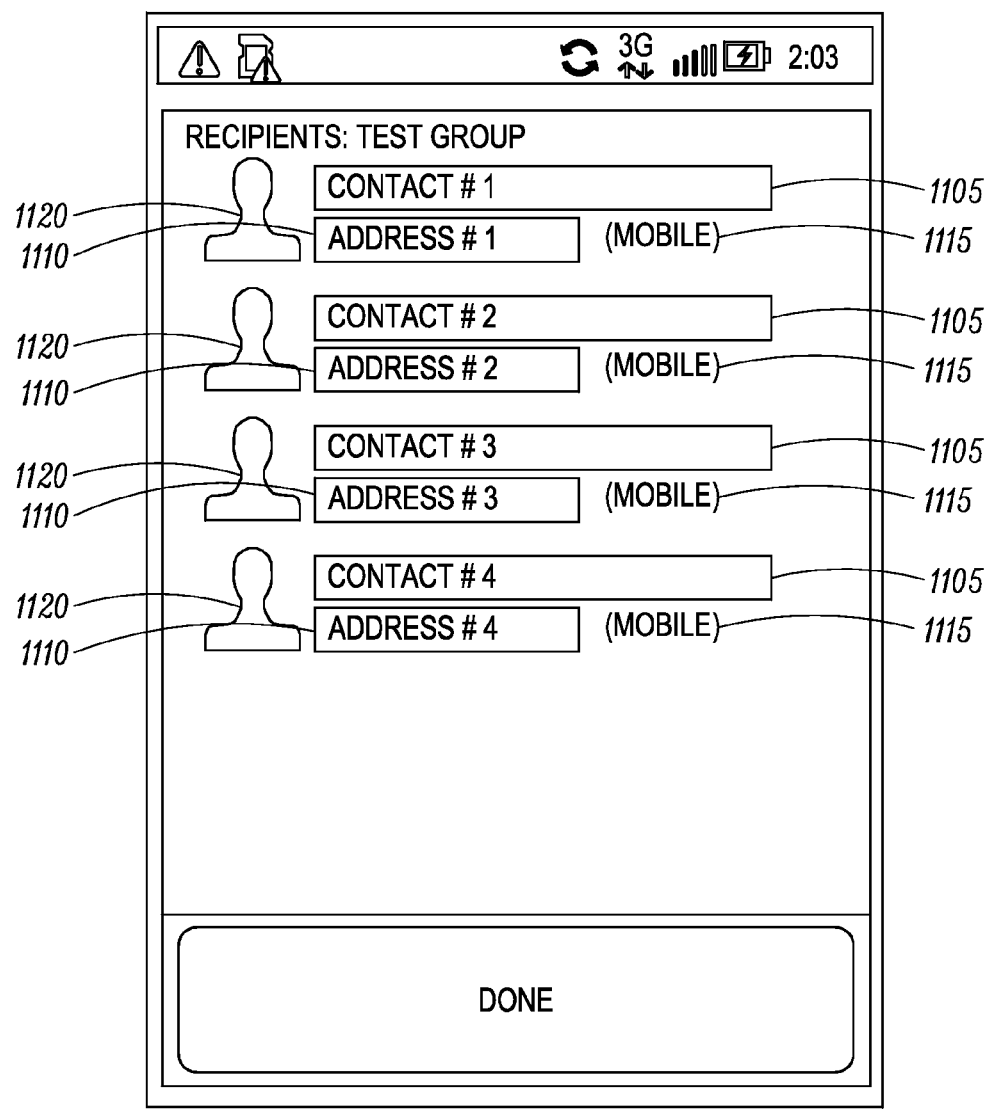
FIG. 11 is a screen view illustrating a step in the flow diagram of FIG. 10.

Referring to FIG. 11, there is shown a screen view 1100 illustrating a step in the flow diagram of FIG. 10. The screen view 1100 of FIG. 11 represents step 1020 in which contacts associated with the particular group are shown on the display 103 of the electronic device 100. Each contact of the list of contacts includes a contact name 1105 and a contact address 1110 and/or contact communication type 1115. For example, the contact name 1105 may include a user name associated with the contact, the contact address 1110 may include an address (such as an email address, a phone number, and the like) of the contact, and the contact communication type 1115 may include a type of communication associated with the contact (such as a home number, work number, mobile number, facsimile number, pager number and the like). Each contact of the list of contacts may also include a contact visual 1120 representing the contact, such as a photograph, drawing, symbol, default graphic, and the like.

Figure 12:
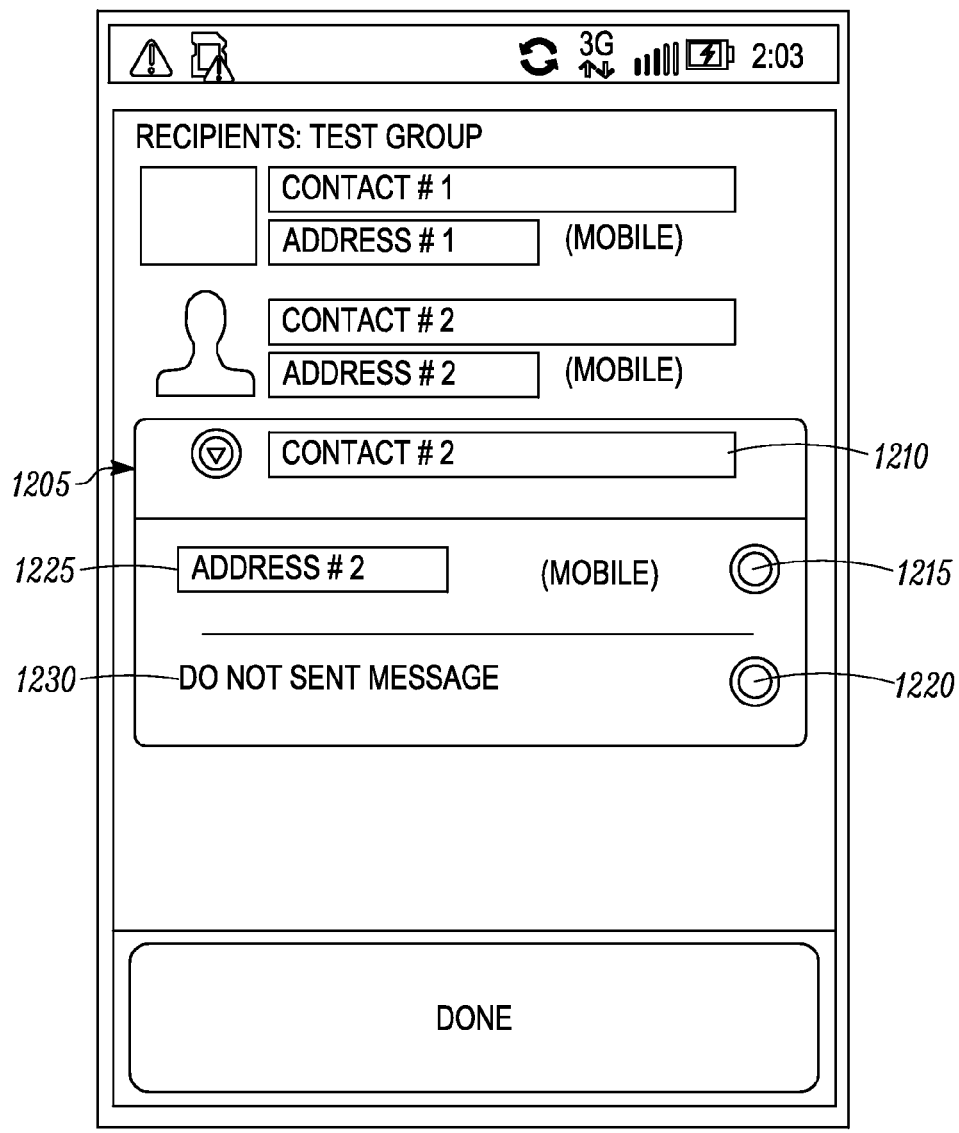
FIG. 12 is a screen view illustrating another step in the flow diagram of FIG. 10.

Referring to FIG. 12, there is shown a screen view 1200 illustrating another step in the flow diagram of FIG. 10. The screen view 1200 of FIG. 12 represents step 1025, in which the electronic device 100 allows selection of contacts to be maintained and/or deleted from the group. For the embodiment shown in FIG. 12, the user interface (such as a touch screen of the display 103, the input keys 105 and/or the input component 209) detects an activation corresponding to a particular contact of the list of contacts. A selection window 1205 overlays the list of contacts of FIG. 11 in response to detecting the activation of the user interface. The selection window 1205 may include a contact header 1210 which identifies the contact of the list of contacts activated and multiple selection options 1215, 1220. As shown in FIG. 12, the selection window 1205 may include one or more addresses 1225 associated with the contact and a designation 1230 for removing or omitting the contact from the selected contact, with each address and the designation corresponding to a particular selection option 1215, 1220. If the selection option 1220 of the designation 1230 is selected, then the selected contact will not be included as part of the group for the particular message. If the selection option 1220 of the designation 1230 is not selected, then the selected contact will be included as part of the group for the particular message.

Figure 13:
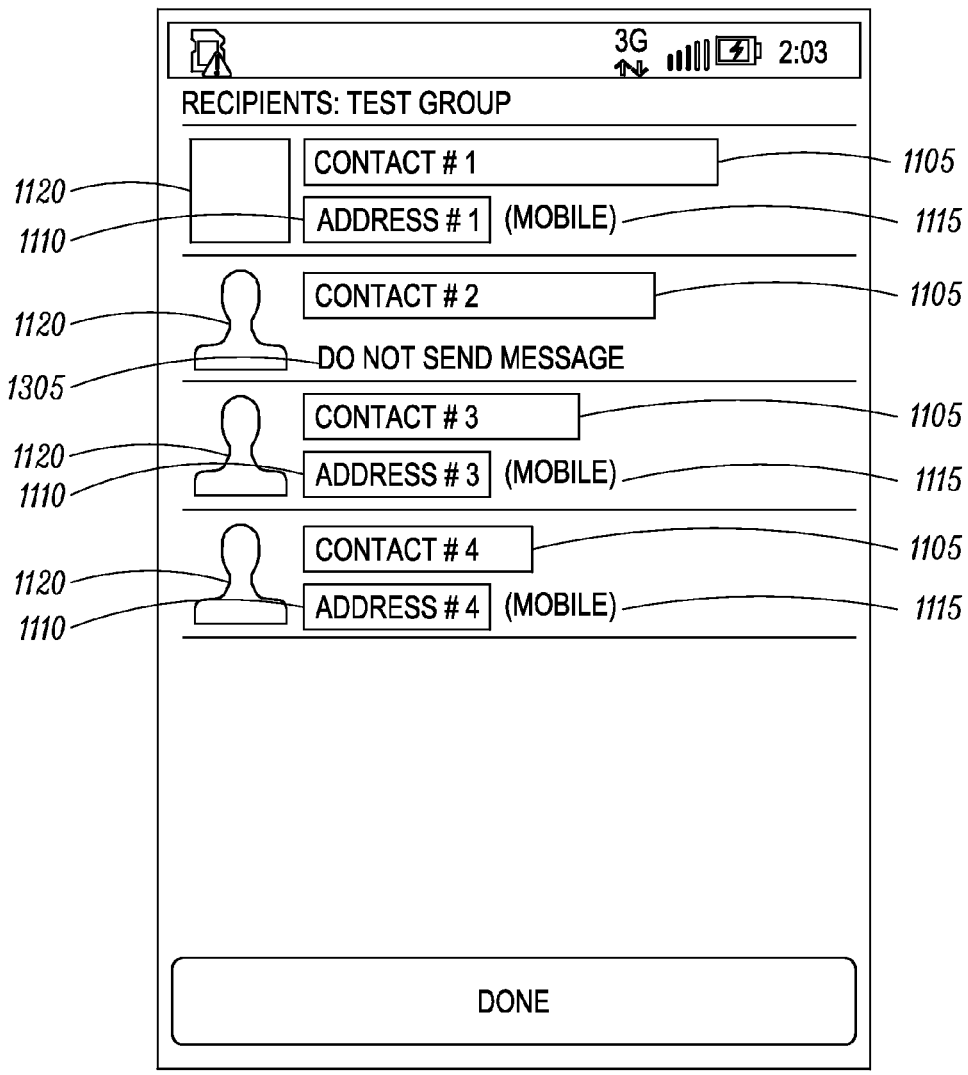
FIG. 13 is a screen view illustrating yet another step in the flow diagram of FIG. 10.

Referring to FIG. 13, there is shown a screen view 1300 illustrating yet another step in the flow diagram of FIG. 10. The screen view 1300 of FIG. 13 represents step 1035, in which the display 103 of the electronic device 100 shows the contacts of the group that are potential recipients of the current message and/or are not potential recipients of the current message. The screen view 1300 is presented at the display 103 in response to termination of the selection of contacts to be maintained and/or deleted from the group of step 1025. For one embodiment, each contact that is removed or omitted from the group at step 1025 is associated with an removal indicator 1305 so that a user will know which contacts of the list remain with the group and which contacts are no longer part of the group. For another embodiment, each contact that is maintained in the group at step 1025 is associated with a maintaining indicator. For still another embodiment, removal indicators 1305 and maintaining indicators may be used for the contacts of the list.

Figure 14:
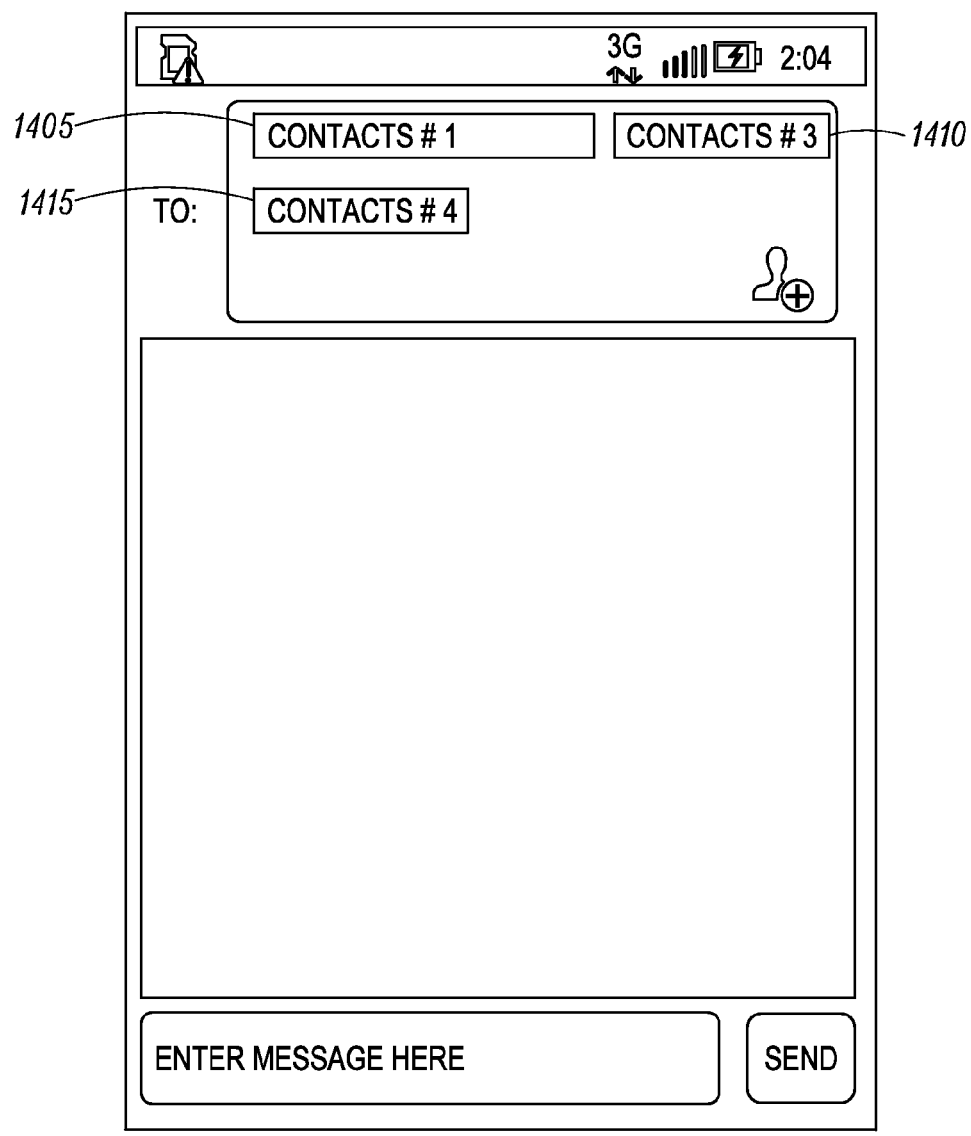
FIG. 14 is a screen view illustrating still another step in the flow diagram of FIG. 10.

Referring to FIG. 14, there is shown a screen view 1400 illustrating still another step in the flow diagram of FIG. 10. The screen view 1400 of FIG. 14 represents step 1045, in which the electronic device 100 replaces the group name with the individual contacts 1405, 1410, 1415 of the group that are potential recipients of the current message. As illustrated in FIGS. 5 and 6, a group name may be provided in a heading of a current message. By following the flow diagram 1000 represented by FIG. 10, the group name is removed from the header and individual contacts 1405, 1410, 1415 of the group that remain are added to the header in its place. For the embodiment shown in FIG. 10, Contact #2 selected for removal from the group at step 1025 while Contacts #1, #3 and #4 remain, thus, Contact #1 1405, Contact #3 1401 and Contact #4 1415 replace the group name in the header.

While the preferred embodiments of the invention have been illustrated and described, it is to be understood that the invention is not so limited. For example, although the above description refers to touch input and touch sensors, the present invention may be practiced with non-touch-sensitive input components, such as the other input components described above. Numerous modifications, changes, variations, substitutions and equivalents will occur to those skilled in the art without departing from the spirit and scope of the present invention as defined by the appended claims.

What is claimed is:

1. A method of an electronic device for providing group information associated with a group of contacts at a display, the method comprising:

obtaining a group name associated with a group of contacts;

allowing selection of at least one contact of the group of contacts at a user interface;

providing distinction between contacts of the group of contacts that are recipients and contacts of the group of contacts that are not recipients based on the selection of the at least one contact at the display; and displaying contacts of the group of contacts that are recipients in place of the group name at a display.

2. The method of claim 1, wherein obtaining a group name includes receiving the group name from the user interface of the electronic device.

3. The method of claim 1, wherein obtaining a group name includes retrieving the group name from a memory of the electronic device.

4. The method of claim 1, wherein displaying contacts of the group of contacts that are recipients in place of the group name at a display includes displaying the contacts of the group of contacts that are recipients in place of the group name at a header of the display.

5. The method of claim 1, wherein providing distinction between contacts of the group of contacts that are recipients and contacts of the group of contacts that are not recipients includes.

6. The method of claim 1, wherein providing distinction between contacts of the group of contacts that are recipients and contacts of the group of contacts that are not recipients comprising:

providing the contacts of the group of contacts that are recipients and the contacts of the group of contacts that are not recipients at the display; and providing at least one indicator to distinguish contacts of the group of contacts that are recipients from contacts of the group of contacts that are not recipients.

7. The method of claim 1, wherein providing distinction between contacts of the group of contacts that are recipients and contacts of the group of contacts that are not recipients includes providing the contacts of the group of contacts that are recipients at the display without the contacts of the group of contacts that are not recipients.

8. The method of claim 1, wherein providing distinction between contacts of the group of contacts that are recipients and contacts of the group of contacts that are not recipients includes providing the contacts of the group of contacts that are not recipients at the display without the contacts of the group of contacts that are recipients.

9. The method of claim 1, further comprising detecting initiation of a message creation at the user interface of the electronic device.

10. The method of claim 1, further comprising detecting initiation of a group edit at the user interface of the electronic device.

11. The method of claim 1, further comprising displaying the group of contacts at the display.

12. The method of claim 1, further comprising detecting termination of the selection of the at least one contact of the group of contacts at the user interface.

13. The method of claim 1, further comprising detecting termination of a group edit at the user interface.

14. The method of claim 1, further comprising allowing editing of a message associated with the group information based on input from the user interface.

15. The method of claim 1, further comprising sending a message associated with the group information via a wireless transmitter.

* * * * *